United States Patent
Xu

(10) Patent No.: US 9,268,184 B2
(45) Date of Patent: Feb. 23, 2016

(54) SUB-PIXEL STRUCTURE, LIQUID CRYSTAL DISPLAY DEVICE AND METHOD FOR REDUCING COLOUR SHIFT

(71) Applicant: SHENZHEN CHINA STAR OPTOELECTRONICS TECHNOLOGY CO., LTD., Shenzhen, Guangdong (CN)

(72) Inventor: Hongyuan Xu, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 18 days.

(21) Appl. No.: 14/351,157

(22) PCT Filed: Feb. 19, 2014

(86) PCT No.: PCT/CN2014/072219
§ 371 (c)(1),
(2) Date: Apr. 11, 2014

(87) PCT Pub. No.: WO2015/109621
PCT Pub. Date: Jul. 30, 2015

(65) Prior Publication Data
US 2015/0205177 A1    Jul. 23, 2015

(30) Foreign Application Priority Data
Jan. 23, 2014    (CN) .......................... 2014 1 0033352

(51) Int. Cl.
G02F 1/1362    (2006.01)
G02F 1/1368    (2006.01)
G02F 1/1343    (2006.01)

(52) U.S. Cl.
CPC ........ *G02F 1/136213* (2013.01); *G02F 1/1368* (2013.01); *G02F 1/134309* (2013.01); *G02F 2001/134345* (2013.01)

(58) Field of Classification Search
CPC .............. G09G 2320/0626; G09G 2320/0276; G09G 2320/16; G09G 3/3648; G09G 3/3611
USPC .......................................................... 345/204
See application file for complete search history.

(56) References Cited

U.S. PATENT DOCUMENTS

| 8,174,636 | B2* | 5/2012 | Chen ................... G02F 1/13624 349/38 |
| 2008/0309600 | A1* | 12/2008 | Lee ...................... G09G 3/3648 345/89 |
| 2012/0026447 | A1* | 2/2012 | Xi ..................... G02F 1/136213 349/144 |
| 2012/0112193 | A1* | 5/2012 | Chiu ................... H01L 27/1255 257/59 |
| 2012/0162294 | A1* | 6/2012 | Choi .................... G09G 3/3648 345/694 |
| 2013/0215348 | A1* | 8/2013 | Chen ...................... G02F 1/1362 349/43 |

* cited by examiner

*Primary Examiner* — Keng Chang
*Assistant Examiner* — Nathan Brittingham

(57) ABSTRACT

The present application relates to a sub-pixel structure, a liquid crystal display device and a method for reducing color shift, the sub-pixel structure comprises a main area, a sub area and a signal wire, and the sub-pixel structure further comprises a first voltage dividing unit, the signal wire is connected to the main area and is connected to the sub area via the voltage dividing unit; the signal wire respectively provides different driving voltages for the main area and the sub area for reducing color shift in a liquid crystal display device. The present application has advantages on solving the color shift in relation to viewing angle in LCDs and greatly reducing cost.

6 Claims, 5 Drawing Sheets

SUB-PIXEL STRUCTURE, LIQUID CRYSTAL DISPLAY DEVICE AND METHOD FOR REDUCING COLOUR SHIFT

TECHNICAL FIELD

The present application relates to the field of liquid crystal display, and more particularly, relates to a sub-pixel structure, a liquid crystal display device and a method for reducing color shift.

BACKGROUND

LCDs (Liquid crystal displays) are widely used as a kind of flat panel displayer, and most of the LCDs realize image display by using a liquid crystal switch to adjust the light intensity of a backlight. LCD has multi display mode, wherein, VA mode is a kind of common display mode which has high contrast, wide viewing angle, no need to rub and other advantages. However, since the VA mode using vertical rotating liquid crystal, and the liquid crystal molecules have big birefringence difference, result in serious color shift problem in a large viewing angle. Low color shift is always a pursuit of the VA mode.

A popular way to solve the color shift problem is eight domains improving technology which makes the liquid crystal molecules of two sub-pixel structures in a same pixel structure have different rotation angles, thus to reduce the color shift. The designs to improve the color shift mainly comprise condenser coupling CC technology, 2D1G/2G1D technology, charge sharing CS technology, Vcom voltage modulating technology and so on. Among these designs, the 2D1G technology use two signal wires which have different voltages provided for the sub-pixel structures in a same row, thus to realize eight domains display. But this design needs to double the number of the signal wires, and accordingly need to double the number of conversion chips connected to the signal wires, which will increase cost of panel.

SUMMARY

The objective of the present application is to provide a sub-pixel structure, a liquid crystal display device and a method, which has simple circuit and been used for reducing color shift in order to overcome the existing drawback that while using the 2D1G technology to solve the color shift of LCD, it needs to add signal wires and thus to increase cost.

The present application provides a sub-pixel structure comprising a main area, a sub area and a signal wire, wherein, the sub-pixel structure further comprising a voltage dividing unit, the signal wire is connected to the main area and connected to the sub area via the voltage dividing unit; the signal wire respectively provides different driving voltages for the main area and the sub area for reducing color shift of a liquid crystal display device.

In one embodiment, the sub-pixel structure comprising a common wire, and the common wire has a common voltage Vcom; the voltage dividing unit includes a first voltage dividing unit and a second voltage dividing unit, the first voltage dividing unit is respectively connected to the signal wire and the sub area, one end of the second voltage dividing unit is connected to the first voltage dividing unit and the sub area, the other end of the second voltage dividing unit is connected to the common wire; an equivalent resistance of the first voltage dividing unit is r1, an equivalent resistance of the second voltage dividing unit is r2, the signal wire provides a first driving voltage V1 to the main area, and after the voltage V1 being divided by the first voltage dividing unit and the second voltage dividing unit, the signal wire provides a second driving voltage V2 to the sub area, and the first driving voltage V1, the second driving voltage V2 and the common voltage Vcom meets following formula $$V2 = r2(V1 - Vcom)/(r1+r2) + Vcom.$$

In this embodiment, the first voltage dividing unit includes two first thin film transistors, drain electrode and source electrode of one first thin film transistor are respectively connected to source electrode and drain electrode of the other first thin film transistor, and grid electrode of each first thin film transistor is connected to source electrode of the same first thin film transistor, channel lengths of the two first thin film transistors are pre-set values, thus to make the equivalent resistance of the first voltage dividing unit have a pre-set value r1, the second voltage dividing unit includes two second thin film transistors, drain electrode and source electrode of one second thin film transistor are respectively connected to source electrode and drain electrode of the other second thin film transistor, and grid electrode of each second thin film transistor is connected to source electrode of the same second thin film transistor, channel lengths of the two second thin film transistors are pre-set values, thus to make the equivalent resistance of the second voltage dividing unit have a pre-set value r2.

In this embodiment, the first voltage dividing unit includes a plurality of series-connected via holes, the via holes are defined in an electrically conductive glass corresponding to the main area, and number of the via holes is pre-set, thus to make the equivalent resistance value of the first voltage dividing unit to be r1; the second voltage dividing unit includes a plurality of series-connected via holes, the via holes are defined in an electrically conductive glass corresponding to the sub area, and number of the via holes is pre-set, thus to make the equivalent resistance value of the second voltage dividing unit to be r2.

In this embodiment, the sub-pixel structure further comprising a scanning wire, the main area includes a first storage capacitor, a first liquid crystal capacitor and a first switch unit; the output end of the first switch unit is connected to one end of the first storage capacitor and one end of the first liquid crystal capacitor, the other end of the first storage capacitor and the other end of the first liquid crystal capacitor are connected to a common voltage point; the sub area includes a second storage capacitor, a second liquid crystal capacitor and a second switch unit; the output end of the second switch unit is connected to one end of the second storage capacitor and one end of the second liquid crystal capacitor, the other end of the second storage capacitor and the other end of the second liquid crystal capacitor are connected to a common voltage point; the signal wire is connected to an input end of the first switch unit, one end of the first voltage dividing unit is connected to an input end of the second switch unit, and the other end of the first voltage dividing unit is connected to the signal wire; a controlling end of the first switch unit and a controlling end of the second switch unit are all connected to the scanning wire.

In this embodiment, the first switch unit and the second switch unit both are thin film transistor switches.

In this embodiment, the common wire is a ground wire, and the common voltage Vcom is 0.

The present application provides a liquid crystal display device, wherein, comprising a plurality of the sub-pixel structures according to claim 1.

The present application provides a method for reducing color shift, wherein comprises following steps:

S: a signal wire provides a first driving voltage V1 to a main area of a sub-pixel structure;

T: the signal wire 13 provides a second driving voltage V2 to a sub area 12 of the sub-pixel structure via a voltage dividing unit.

In this embodiment, the step T further comprises: a first voltage dividing unit is respectively connected to the sub area and the signal wire, a common point of the first voltage dividing unit and the sub area is connected to a common wire via a second voltage dividing unit;

the common wire has a common voltage Vcom, an equivalent resistance of the first voltage dividing unit is r1, an equivalent resistance of the second voltage dividing unit is r2; the first driving voltage V1, the second driving voltage V2 and the common voltage Vcom are meet following formula:

$$V2 = r2(V1-Vcom)/(r1+r2) + Vcom.$$

When implementing the present application, the following advantageous effects can be achieved: each sub-pixel structure is divided into a main area and a sub area in the present application, each sub-pixel structure respectively provides different driving voltages for the main area and the sub area, thus to make the liquid crystal corresponding to the main area and the sub area have different inclination angles in order to solve the color shift problem of a liquid crystal squint angle. In addition, since a signal wire and a voltage divided unit are coordinated to provide different driving voltages to the main area and the sub area in the present application, the number of the signal wires is reduced and the number of the conversion chips connected to each signal wire is accordingly reduced, thus to reduce cost and volume.

BRIEF DESCRIPTION OF THE DRAWINGS

The present application will be further described with reference to the accompanying drawings and embodiments in the following, in the accompanying drawings.

DETAILED DESCRIPTION OF THE PREFERRED EMBODIMENT

Figure 1:
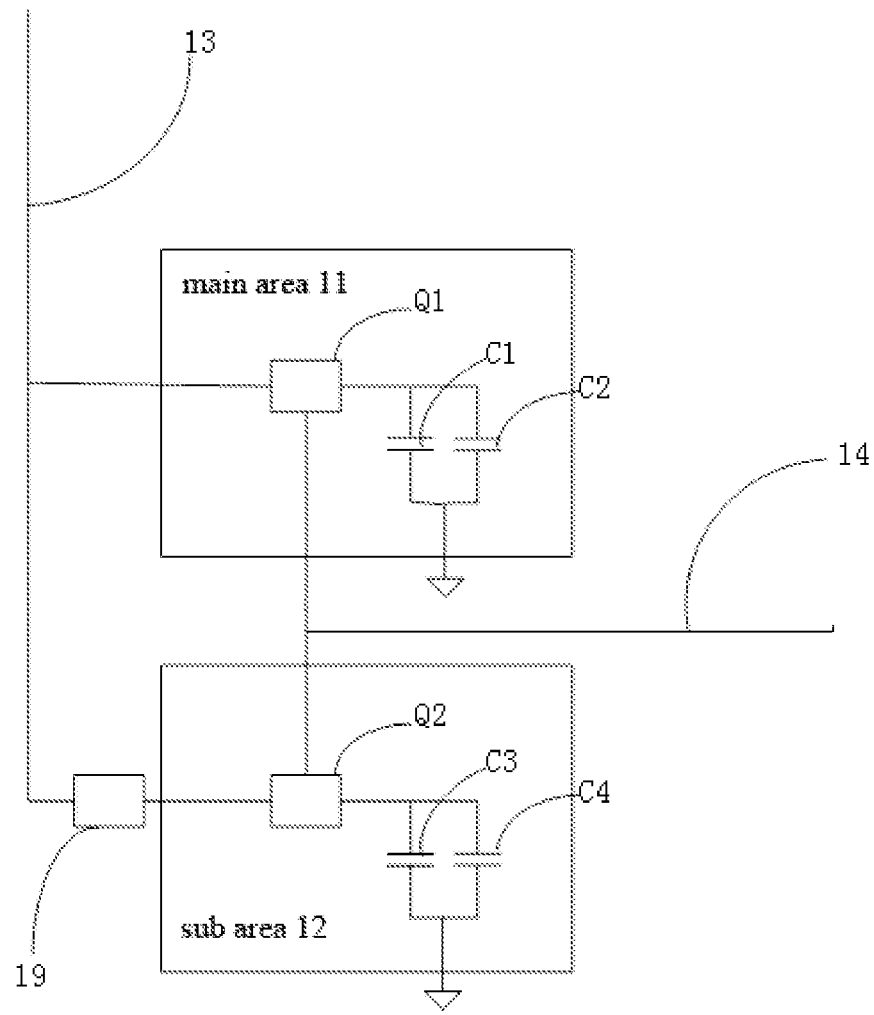
FIG. 1 is a circuit schematic diagram of a sub-pixel structure, according to a first embodiment of the present application.

In order to make the technical features, the propose and the technical effect of the present application more clearly, the present application will now be described in detail with reference to the accompanying drawings and embodiments.

The present application provides a sub-pixel structure, a liquid crystal display device and a method for reducing color shift, which are mainly applied to a large-sized liquid crystal displayer with VA display mode. In the present application, each sub-pixel structure is divided into a main area 11 and a sub area 12, and respectively provides different driving voltages for the main area 11 and the sub area 12, thus to make the liquid crystal which is correspond to the main area 11 and the sub area 12 have different inclined angles in order to solve the color shift in relation to viewing angle in LCDs. In addition, since a signal wire 13 and a voltage divided unit are coordinated to provide different driving voltages for the main area 11 and the sub area 12 in the present application, the number of the signal wires 13 is reduced and the number of conversion chips 20 connected to each signal wire 13 is accordingly reduced. Therefore, the cost is greatly saved.

As shown in FIG. 1, the sub-pixel structure comprises a main area 11, a sub area 12, a signal wire 13, a scanning wire 14 and a voltage dividing unit 19. The signal wire 13 connected to the main area 11 is connected to the sub area 12 via the voltage dividing unit 19, and the voltage dividing unit 19 is used for providing voltage to the sub area 12 to reducing color shift of a liquid crystal display device, and the voltage provided to the sub area 12 is different from the voltage provided to the main area 11.

In detail, the main area 11 includes a first storage capacitor C1, a first liquid crystal capacitor C2 and a first switch unit Q1. The output end of the first switch unit Q1 is connected to one end of the first storage capacitor C1 and one end of the first liquid crystal capacitor C2, the other ends of the first storage capacitor C1 and the other end of the first liquid crystal capacitor C2 are connected to a common voltage, such as connected to ground. Since electric quantity stored in the first liquid crystal capacitor C2 will soon be discharged, the first storage capacitor C1 need to store electric quantity for the first liquid crystal capacitor C2.

The sub area 12 includes a second storage capacitor C3, a second liquid crystal capacitor C4 and a second switch unit Q2. The output end of the second switch unit Q2 is connected to one end of the second storage capacitor C3 and one end of the second liquid crystal capacitor C4 r, the other ends of the second storage capacitor C3 and the other end of the second liquid crystal capacitor C4 are connected to a common voltage. Since electric quantity stored in the second liquid crystal capacitor C4 will soon be discharged, the second storage capacitor C3 need to store electric quantity for the second liquid crystal capacitor C4.

The signal wire 13 is connected to the input end of the first switch unit Q1. One end of the voltage dividing unit 19 is connected to the input end of the second switch unit Q2, and the other end of the voltage dividing unit 19 is connected to the signal wire 13. A controlling end of the first switch unit Q1 and a controlling end of the second switch unit Q2 are all connected to the scanning wire 14. The signal wire 13 provides a first driving voltage V1 to the main area 11 and provides a second driving voltage V2 to the sub area 12 via the voltage dividing unit 19. The scanning wire 14 provides a scanning voltage to the controlling ends of the first switch unit Q1 and the second switch unit Q2, thus to control the first switch unit Q1 and the second switch unit Q2 to power on or off.

It is understandable that the main area 11 and the sub area 12 can use other common four domains display design.

Preferably, the first switch unit Q1 and the second switch unit Q2 both are thin film transistor switches.

Figure 2:
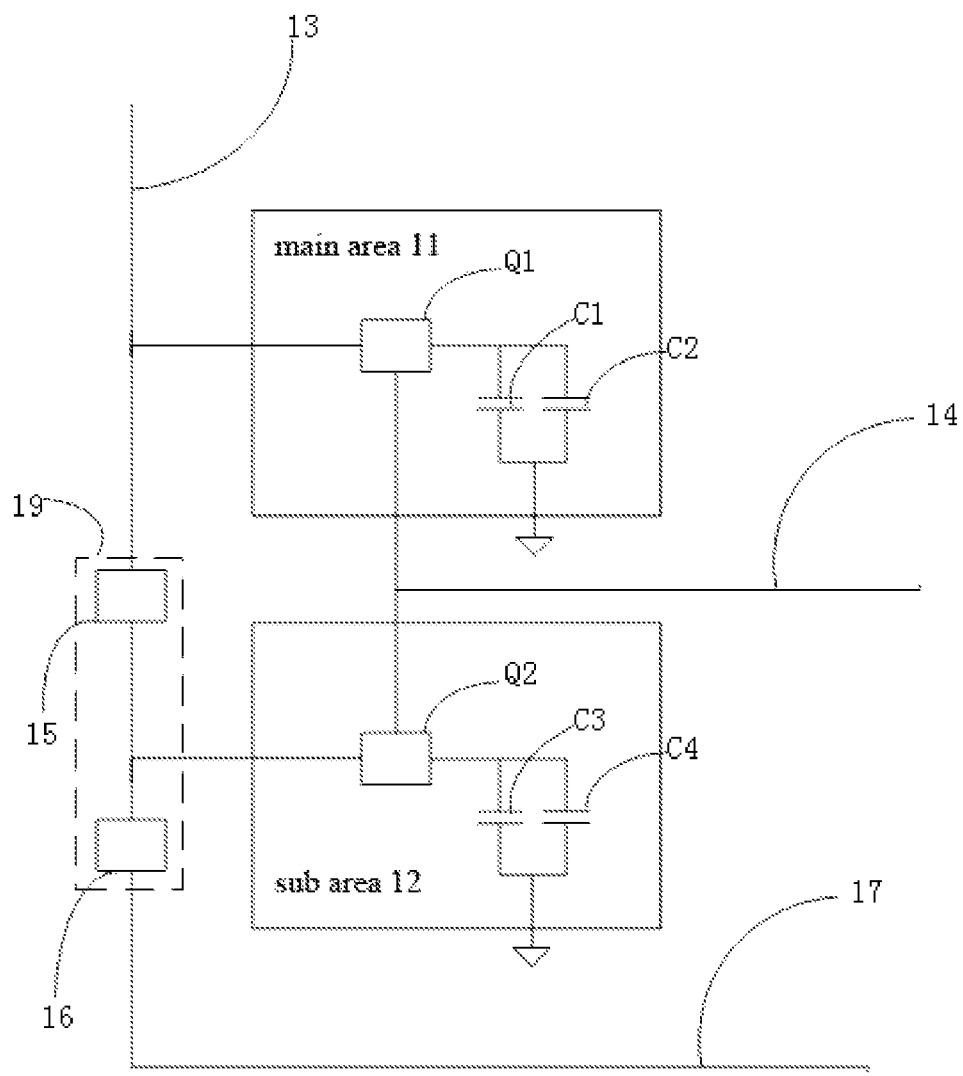
FIG. 2 is a circuit schematic diagram of a sub-pixel structure, according to a second embodiment of the present application.

As shown in FIG. 2, the second embodiment is based on the first embodiment, the sub-pixel structure 1 further comprises a common wire 17 and the voltage dividing unit 19 includes a first voltage dividing unit 15 and a second voltage dividing unit 16. The common wire 17 has a common voltage Vcom, and the common wire 17 can be a ground line or can have a needed pre-set voltage. The first voltage dividing unit 15 is respectively connected to the signal wire 13 and the sub area 12. One end of the second voltage dividing unit 16 is connected to the first voltage dividing unit 15 and the input end of the second switch unit Q2, the other end of the second voltage dividing unit 16 is connected to the common wire 17. An equivalent resistance of the first voltage dividing unit 15 is r1, an equivalent resistance of the second voltage dividing unit 16 is r2; the first driving voltage V1, the second driving voltage V2 and the common voltage Vcom are meet following formula: V2=r2(V1−Vcom)/(r1+r2)+Vcom. The common wire 17 can be a ground wire and accordingly, the common voltage Vcom is 0.

In this embodiment, while the first voltage dividing unit 15 is coordinating with the second voltage dividing unit 16, the relationship between the first driving voltage V1 of the main area 11 and the second driving voltage V2 of the sub area 12 is a linear relationship, thus to figure out the relationship between the first driving voltage V1 and the second driving voltage V2 by controlling values of the equivalent resistances r1, r2 and the common voltage Vcom.

However, the equivalent resistance values of the first voltage dividing unit 15 and the second voltage dividing unit 16 can be far more bigger than an wire resistance of the signal wire 13 in this embodiment, thus the wire resistance of the signal wire 13 has little effect on voltage dividing, which can improve accuracy of quantitative voltage dividing and convenient to calculate.

It is understandable that the first voltage dividing unit 15 and the second voltage dividing unit 16 can be resistances with pre-set resistance values according to requirement.

Figure 3:
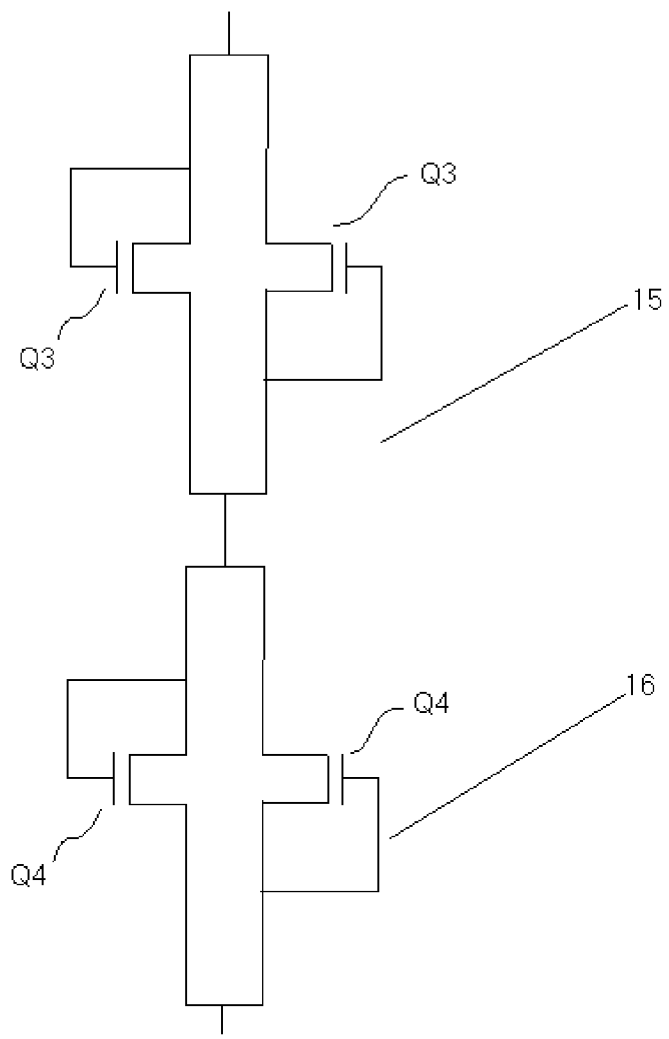
FIG. 3 is a circuit schematic diagram of a voltage divided unit in a sub-pixel structure, according to a third embodiment of the present application.

As shown in the third embodiment based on the second embodiment in FIG. 3, the first voltage dividing unit 15 and the second voltage dividing unit 16 also can be thin film transistors. In detail, the first voltage dividing unit 15 includes two first thin film transistors Q3, the drain electrode and the source electrode of one first thin film transistor Q3 are respectively connected to the source electrode and the drain electrode of the other first thin film transistor Q3, and the grid electrode of each first thin film transistor Q3 is connected to the source electrode of the same first thin film transistor Q3. Channel lengths of the two first thin film transistors Q3 are pre-set values, thus to make the equivalent resistance of the first voltage dividing unit 15 have a pre-set value r1.

The second voltage dividing unit 16 includes two second thin film transistors Q4, the drain electrode and the source electrode of one second thin film transistors Q4 are respectively connected to the source electrode and the drain electrode of the other second thin film transistor Q4, and the grid electrode of each second thin film transistor Q4 is connected to the source electrode of the same second thin film transistor Q4. Channel lengths of the two second thin film transistors Q3 are pre-set values, thus to make the equivalent resistance of the second voltage dividing unit 16 have a pre-set value r2.

And in this embodiment, the first voltage dividing unit 15 and the second voltage dividing unit 16 form an equivalent voltage regulator tube, thus to have an effect of stabilizing voltage, which can prevent overs voltages from damaging various components in the sub-pixel structure.

In the fourth embodiment based on the second embodiment, a way to realize the first voltage dividing unit 15 and the second voltage dividing unit 16 can be connecting via holes in series.

In detail, the first voltage dividing unit 15 includes a plurality of series-connected via holes which are defined in an electrically conductive glass corresponding to the main area 11, and number of the via holes is pre-set, thus to make the equivalent resistance value of the first voltage dividing unit 15 to be r1. The second voltage dividing unit 16 includes a plurality of series-connected via holes which are defined in an electrically conductive glass corresponding to the sub area 12, and number of the via holes is pre-set, thus to make the equivalent resistance value of the second voltage dividing unit 16 to be r2. For example, if the equivalent resistance of each via hole is detected to be 100Ω and the equivalent resistance r1 is 1000Ω, ten via holes are needed to be connected in series.

In the fifth embodiment based on the second embodiment, the first voltage dividing unit 15 and the second voltage dividing unit 16 can be metal wires laid out on the electrically conductive glass corresponding to the main area 11 and the sub area 12. The equivalent resistance values of the first voltage dividing unit 15 and the second voltage dividing unit 16 are controlled by controlling lengths of the metal wires.

Figure 4:
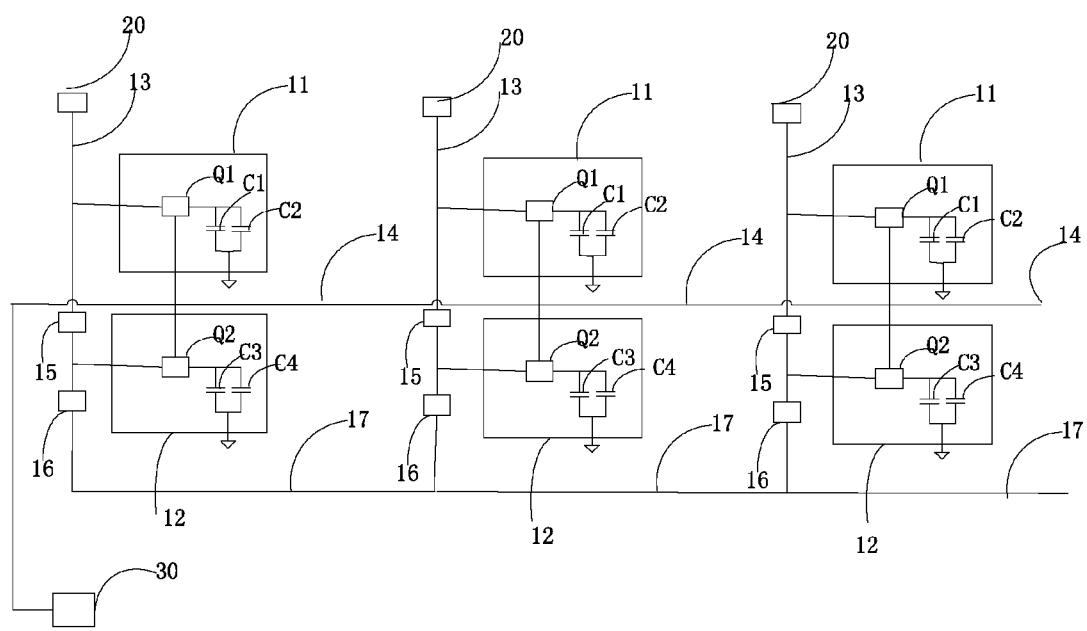
FIG. 4 is a circuit schematic diagram of a liquid crystal display device, according to a preferable embodiment of the present application.
Figure 5:
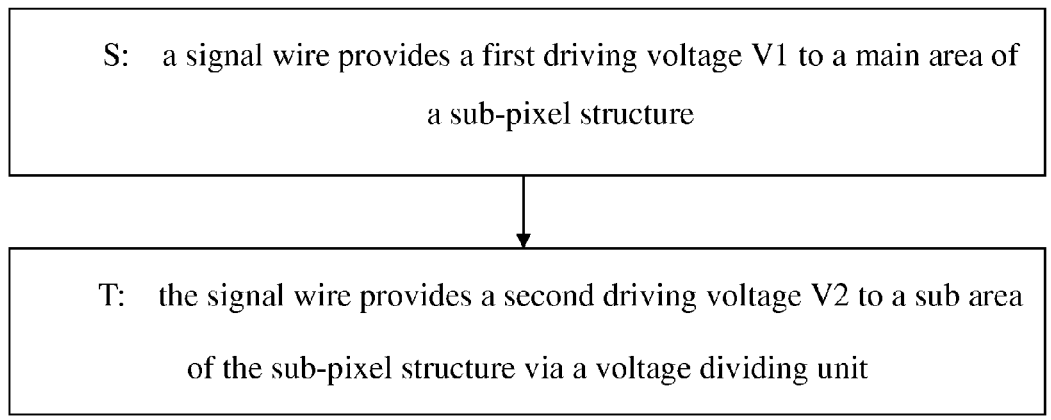
FIG. 5 is a flow diagram of a method for reducing color shift, according to a preferable embodiment of the present application.

As shown in FIG. 4, the present application provides a liquid crystal display device, comprising a plurality of t sub-pixel structures a grid driving circuits 30 and a plurality of conversion chips 20. The sub-pixel structures belong to any one of above embodiments. Each conversion chip 20 is respectively electric connected to the corresponding signal wires 13 for converting external voltage input signals into the pre-set first driving voltage V1. The grid driving circuits 30 provide the scanning voltage to each first switch unit Q1 and each second switch unit Q2, and the grid driving circuits 30 is electric connected to each scanning wire 14.

As shown in FIG. 2, the present application also provides a method for reducing color shift, which comprises following steps:

S: the signal wire 13 provides the first driving voltage V1 to the main area 11 of the sub-pixel structure;

T: the signal wire 13 provides the second driving voltage V2 to the sub area 12 of the sub-pixel structure via the first voltage dividing unit 15.

It is understandable that the step T further comprises:

the common point of the first voltage dividing unit 15 and the sub area 12 is connected to the common wire 17 via the second voltage dividing unit 16;

the common wire 17 has the common voltage Vcom, the equivalent resistance of the first voltage dividing unit 15 is r1, the equivalent resistance of the second voltage dividing unit 16 is r2; the first driving voltage V1, the second driving voltage V2 and the common voltage Vcom are meet following formula:

$$V2 = r2(V1 - Vcom)/(r1 + r2) + Vcom.$$

In the present application, each sub-pixel structure is divided into a main area 11 and a sub area 12, and respectively provides different driving voltages for the main area 11 and the sub area 12, thus to make the liquid crystal corresponding to the main area 11 and the sub area 12 has different inclination angles in order to solve the color shift in relation to viewing angle in LCDs. In addition, since a signal wire 13 and a voltage divided unit are coordinated to provide different driving voltages for the main area 11 and the sub area 12 in the present application, the number of the signal wires 13 is reduced and the number of conversion chips 20 connected to each signal wire 13 is accordingly reduced. Therefore, the cost is greatly saved.

Although the present application is illustrated with the embodiments accompanying the drawings, the present application is not limited to the above-mentioned specific embodiments, and the above-mentioned embodiments are only for illustration, not for limitation. In the inspiration of the present, those skilled in the art may make many modifications for the present application, without going beyond the purpose and the scope the claims intend to protect of the present application, such as the case cover formed integrated with the cover body, all these belong to the protection of the present application.

The invention claimed is:

1. A sub-pixel structure comprising a main area, a sub area, a signal wire, a voltage dividing unit and a common wire,
   wherein, the signal wire is connected to the main area and is connected to the sub area via the voltage dividing unit; the signal wire respectively provides different driving voltages for the main area and the sub area for reducing color shift of a liquid crystal display device;
   the common wire has a common voltage Vcom;
   the voltage dividing unit includes a first voltage dividing unit and a second voltage dividing unit, the first voltage dividing unit is respectively connected to the signal wire and the sub area, one end of the second voltage dividing unit is connected to the first voltage dividing unit and the sub area, the other end of the second voltage dividing unit is connected to the common wire;
   an equivalent resistance of the first voltage dividing unit is r1, an equivalent resistance of the second voltage dividing unit is r2, the signal wire provides a first driving voltage V1 to the main area, and after the voltage V1 being divided by the first voltage dividing unit and the second voltage dividing unit, the signal wire provides a second driving voltage V2 to the sub area; and
   the first driving voltage V1, the second driving voltage V2 and the common voltage Vcom meet following formula:

$$V2=r2(V1-Vcom)/(r1+r2)+Vcom.$$

2. The sub-pixel structure according to claim 1, wherein the first voltage dividing unit includes two first thin film transistors, drain electrode and source electrode of one first thin film transistor are respectively connected to source electrode and drain electrode of the other first thin film transistor, and grid electrode of each first thin film transistor is connected to source electrode of the same first thin film transistor, channel lengths of the two first thin film transistors are pre-set values, thus to make the equivalent resistance of the first voltage dividing unit have a pre-set value r1;
   the second voltage dividing unit includes two second thin film transistors, drain electrode and source electrode of one second thin film transistor are respectively connected to source electrode and drain electrode of the other second thin film transistor, and grid electrode of each second thin film transistor is connected to source electrode of the same second thin film transistor, channel lengths of the two second thin film transistors are pre-set values, thus to make the equivalent resistance of the second voltage dividing unit have a pre-set value r2.

3. The sub-pixel structure according to claim 1, wherein the sub-pixel structure further comprising a scanning wire, the main area includes a first storage capacitor, a first liquid crystal capacitor and a first switch unit; the output end of the first switch unit is connected to one end of the first storage capacitor and one end of the first liquid crystal capacitor, the other end of the first storage capacitor and the other end of the first liquid crystal capacitor are connected to a common voltage point;
   the sub area includes a second storage capacitor, a second liquid crystal capacitor and a second switch unit; the output end of the second switch unit is connected to one end of the second storage capacitor and one end of the second liquid crystal capacitor, the other end of the second storage capacitor and the other end of the second liquid crystal capacitor are connected to a common voltage point;
   the signal wire is connected to an input end of the first switch unit, one end of the first voltage dividing unit is connected to an input end of the second switch unit, and the other end of the first voltage dividing unit is connected to the signal wire; a controlling end of the first switch unit and a controlling end of the second switch unit are all connected to the scanning wire.

4. The sub-pixel structure according to claim 3, wherein the first switch unit and the second switch unit both are thin film transistor switches.

5. The sub-pixel structure according to claim 1, wherein the common wire is a ground wire and the common voltage Vcom is 0.

6. A liquid crystal display device, comprising a plurality of the sub-pixel structures according to claim 1.

* * * * *